Jan. 10, 1967          J. LA RAUS          3,297,289

FLORISTS' FLOWER DELIVERY HOLDER

Filed May 17, 1965

INVENTOR.
JULIUS LA RAUS
BY
ATTORNEY

United States Patent Office 3,297,289
Patented Jan. 10, 1967

3,297,289
FLORISTS' FLOWER DELIVERY HOLDER
Julius La Raus, 56 Harvester Ave., Batavia, N.Y. 14020
Filed May 17, 1965, Ser. No. 456,098
10 Claims. (Cl. 248—152)

This invention relates to holders for flower vases and the like, and more particularly to holders usable by florists for supporting flower vases, urns, figurines, stemware, footed containers, and potted plants during delivery thereof.

Nowadays florists to a great extent send cut flowers out in vases instead of in boxes and deliver many growing plants in urns, figurines, footed containers, and pots. Generally the cut flowers are placed in a vase containing water or some moist material, and a sheet of wax paper or the like is placed over the flowers and secured around the bottom of the vase. Growing flowers have a piece of wax paper wrapped over them and secured around the pot or other container in which they are growing.

This shipping technique has advantages, but it also has its disadvantages. One of the disadvantages in the case of cut flowers is that, if the vase or other flower holder is not maintained upright during delivery, the water used for keeping the flowers fresh will leak out or be spilled. Also for any flower container, of course, if the vase or other holder tips over during transit, the flowers are liable to be damaged.

A primary object of the present invention is to provide a holder for flower vases and the like, which will maintain a vase, urn, figurine, stemware, footed container, upright during delivery thereof, and which will insure delivery of the flowers intact and undamaged.

Another object of this invention is to provide an inexpensive holder of the type described, which is readily adaptable for holding various sizes of flower containers.

Another object of this invention is to provide a simple, relatively inexpensive holder for flower vases, pots, etc. which is expendable and which will not only maintain the flower container upright during delivery thereof but make it easier to handle flower deliveries.

Another object of the invention is to provide a holder for flower containers which will save packing time during preparation of the flowers for delivery.

A more specific object of this invention is to provide a waterproof, corrugated blank, which can readily be adapted into a holder around the bottom of a flower vase, urn, figurine, stemware, footed or pedestaled container, or potted plant, in order to support the flower container upright during delivery thereof.

Other objects of the invention will be apparent hereinafter from the specification and from the recital of the appended claims, particularly when read in conjunction with the accompanying drawing.

Figure 1:
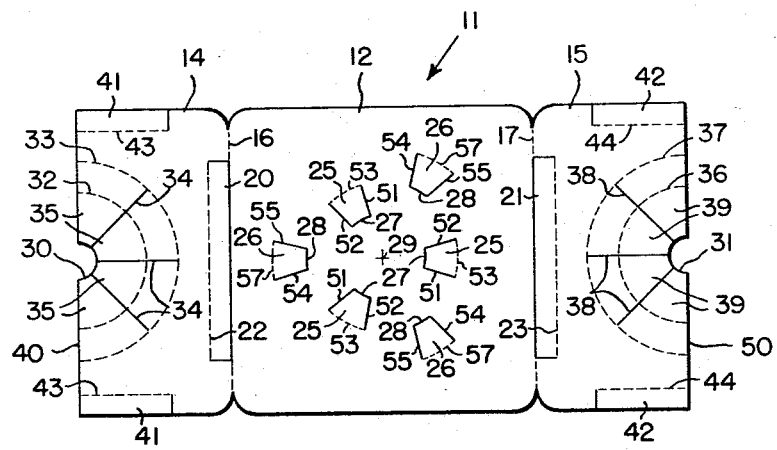
FIG. 1 is a plan view of a blank for a flower container holder made in accordance with a presently preferred embodiment of this invention.

Referring now to the drawing by numerals of reference, 11 designates the blank, from which the holder is made, which is here shown partially opened up. 12 designates the central panel or base section of the holder, and 14 and 15 denote its integral side or cover panels. The blank 11 is scored at the junctures of the central panel 12 with the side panels 14 and 15 as denoted at 16 and 17, respectively, to permit the side panels or cover sections 14 and 15 to pivot or fold relative to the base section 12.

The blank 11 is slit partway along each fold line 16 and 17 to form on each side panel or cover section 14 and 15 an integral flap, denoted at 20 and 21, respectively. Each side panel 14 and 15 is scored along a line, denoted at 22 and 23 for the respective side panel, parallel to and adjacent the fold lines 16 and 17.

The base section 12 is slit to provide therein two concentric groups of flexible tongues or tabs 25 and 26, respectively. The tabs of each group are equi-angularly spaced from one another about a common center 29. The three tabs 25, which are formed by slitting the base section along arcs 27 and along lines 51 and 52 radial of the center 29, are free to be bent upwardly along score lines 53. The three tabs 26, which are radially spaced a greater distance from the center 29 than are the three tabs 25, are formed by slitting the base section along arcs 28 and along lines 54 and 55 radial of center 29. They are free to be bent upwardly along score lines 57.

In the embodiment illustrated, the curved inner ends 27 of the tabs 25 lie in a common circle the center of which is the center 29; and the curved inner ends 28 of the tabs 26 lie in an imaginary circle of greater radius the center of which is also located at 29.

Medially of its outer edge each of the side sections 14 and 15 is provided with a semi-circular recess, denoted at 30 and 31, respectively. Section 14 is scored to form semi-circular fold lines 32 and 33, which are radially spaced from one another coaxially of recess 30. Section 14 is slit from the radially outermost fold line 33 along three lines 34, which extend radially of recess 30 in equi-angularly spaced relation with one another and with the outer marginal edge 40 of the section 14. The slits 34 thus divide section 14 into four, generally sector-shaped tongues 35, each of which is foldable at its inner end about the fold line 33, and intermediate its ends about the fold line 32.

In like manner section 15 is scored to provide two semi-circular fold lines 36 and 37 which are radially spaced from one another coaxially of semi-circular recess 31. Section 15 is slit from the radially outermost score line 37 along three lines 38, which extend radially from recess 31 in equi-angularly spaced relation with one another and with the outer marginal edge 50 of section 15. These slits divide section 15 into four, generally sector-shaped tongues 39, which are foldable at their inner ends about the fold line 37, and intermediate their ends about the fold line 36.

At each end thereof, each side panel 14 and 15 is also provided with an integral flap, denoted at 41 and 42, respectively, which extends perpendicular to the flap 20 or 21, respectively, thereof. The flaps 41 extend from the outer edge of the section 14 partway toward the inner edge thereof, and each is adapted to be folded about a score line 43. The flaps 42 extend from the outer edge of the end section 15 partway toward the inner end thereof, and each is adapted to fold about a score line 44.

Figures 2, 3:
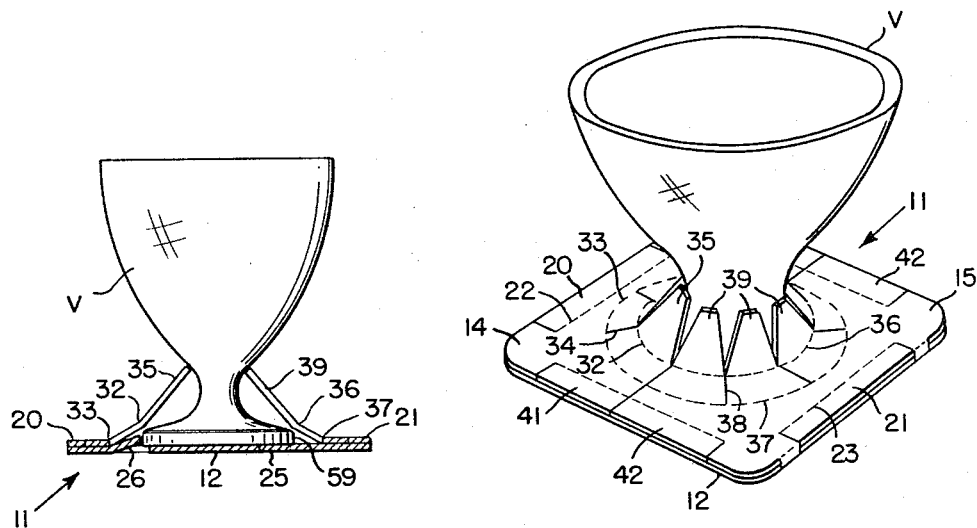
FIG. 2 is a sectional view showing the blank folded into supporting position and showing a flower vase held therein.
FIG. 3 is a perspective view of this holder and of the vase mounted therein.

FIGS. 2 and 3 show how the device may be used to hold a flower vase V. The side panels 14 and 15 are folded outwardly off of central panel 12. Vase V is then placed centrally on panel 12; and either the tabs 25 or the tabs 26, depending upon the diameter of the base of the vase, are pushed up from the panel 12 so that the concavedly shaped inner ends thereof embrace the base of the vase around its periphery 59. In the example illustrated in FIG. 2, the base of the vase V is quite large, so that the tabs 26 have been struck up. For a vase of substantially smaller diameter, the tabs 25 would be used in lieu of tabs 26. The inner ends of the tabs press resiliently against the outer peripheral surface of the base of the vase, thereby helping to secure the vase against sliding on section 12.

After the tabs 25 or 26 have been seated against the base of the vase, the side sections 14 and 15 are folded about their fold lines 16 and 17 to overlap the base of the vase; and their respective tongue portions 35 and 39 are engaged with the vase. The tongues 35 and 39 are folded along fold lines 32 and 33 and 36 and 37, respectively, so that the vase is surrounded and held by the resilient tongues 35 and 39. The notches 30 and 31 help accommodate the vase. The flaps 41 and 42 on sections 14 and 15 are then stapled, taped, or otherwise secured to the base panel to hold the sections 14 and 15 in gripping engagement with the vase. Because of their concentric disposition about the vase V, the fingers 35 and 39 tend to support it upright. For a vase which has a relatively small outer diameter, the tongues 35 and 39 may bend only about the fold lines 32 and 36. However, for a vase having a larger diameter (see e.g. FIG. 2), the tongues fold about both the fold lines 32, 33 and 36, 37.

After the vase has been secured in the holder, wax paper or the like is placed over the flowers in the vase, and is tucked and, if necessary to hold it in place, is stapled or taped beneath the flaps 21 and 20, or 41 and 42 provided for this purpose.

While it is preferred that the panel 11 be made from corrugated cardboard, it is to be understood that plastic material may be used instead. Either material has the advantage that it will not come apart when wet. Moreover, while in the embodiment illustrated, each side panel 14 and 15 is provided with four flexible fingers or tongues 35 and 39, respectively, it is to be understood that this number is shown merely by way of example. Similarly, if desired, a greater number of groups, and/or a greater number of tabs 25 and 26 in each group thereof, may be employed.

While the invention has been illustrated in connection with holding a vase for delivery, it will be understood, as previously indicated, it can be used also for holding urns, figurines, stemware, footed containers and pots containing growing flowers. The tabs 35 and 39 and/or 25, 26 embrace the urns, pots, etc. in a manner similar to that in which they are shown embracing the vase V. The device adjusts to any size and shape of container within its range of adjustment. It saves time, work, and money. The central panel section 12 provides a broad base for easily carrying and transporting the flower holder. It enables the flowers to be delivered intact and undamaged. For cut flowers, the cost of packaging is about half that of the conventional delivery box and tissues paper; yet it provides a non-tipping base for holding the flower container upright.

While the invention has been described in connection with a specific embodiment thereof, it will be understood that it is capable of further modification, and this application is intended to cover any variations, uses, or adaptations of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:
1. A holder for a flower container, comprising
   (a) a blank having a central panel and pair of side panels, each side panel being foldable to overlie said central panel, and
   (b) each of said side panels having integral therewith a plurality of flexible tongues, the free ends of which are resiliently engageable with a container, when said container is disposed on said central panel, and said side panels are folded over said central panel toward said container,
   (c) each of said side panels having a central arcuate recess in its outer edge,
   (d) said central recesses being complimentary to one another and facing opposite sides of the container when said side panels are folded toward said container,
   (e) each of said side panels being hinged along its inner edge to said central panel and having a plurality of cuts in it which radiate away from said arcuate recesses to provide flexible tongues that are sector-shaped, and
   (f) each of said side panels having in it a plurality of semi-circular score lines, which are disposed concentric of said midpoint and which intersect said tongues intermediate the ends thereof, to provide lines on which tongues may fold.
2. A holder for a flower container, comprising
   (a) a blank having a central panel and a pair of side panels, each side panel being foldable to overlie said central panel, and
   (b) each of said side panels having integral therewith a plurality of flexible tongues, the free ends of which are resiliently engageable with a container when said container is disposed on said central panel and said side panels are folded over said central panel toward said container,
   (c) said central panel having a plurality of integral tabs struck from it at a plurality of points radially spaced from the center of said central panel, and
   (d) said tabs being bendable out of the plane of said central panel to engage resiliently the flower container adjacent the lower end thereof, and at a plurality of points angularly spaced around the periphery of the container.
3. A holder as defined in claim 4, wherein
   (a) a first group of said tabs are equi-spaced radially from said center, and are equiangularly spaced about said center, and
   (b) a second group of said tabs are equi-spaced radially from said center a distance greater than said first group, and are equiangularly spaced about said center.
4. A holder as defined in claim 5, wherein the tabs in said second group are angularly offset with reference to the tabs in said first group.
5. A holder for a flower container, comprising
   (a) a blank having a central panel and a pair of side panels, each side panel being foldable to overlie said central panel, and
   (b) each of said side panels having integral therewith a plurality of flexible tongues, the free ends of which are resiliently engageable with a container, when said container is disposed on said central panel and said side panels are folded over said central panel toward said container,
   (c) said blank being cut along each of the fold lines of said side panels for less than the length of the fold line,
   (d) each of said side panels being provided with spaced, parallel cuts, which extend from the inner edge of the side panel outwardly transverse to and open on the fold line about which the side panel folds, and each of said side panels being scored along a further line, which extends between said parallel cuts to form on each side panel a flap which overlies said central panel along one edge thereof, when said side panels are folded over said central panel.
6. A holder for a flower container, comprising
   (a) a blank having a central panel for supporting a flower container, and a pair of side panels connected to opposite sides, respectively, of said central panel and foldable to overlie said central panel, and
   (b) means on said central panel for engaging and holding the bottom of a flower container against lateral sliding movement on said central panel,
   (c) each of said side panels having integral therewith a plurality of flexible tongues the free ends of which surround and are resiliently engageable with a flower container, when the container is supported on said central panel, and said side panels are folded over said central panel toward said container.

7. A holder as defined in claim 6, wherein
(a) said means comprises a plurality of tabs struck up from said central panel at a plurality of points radially spaced from, and angularly spaced about, the center of said central panel, and
(b) said tabs are bendable out of the plane of said central panel to engage resiliently the flower container adjacent the lower end thereof and at angularly spaced points thereabout.

8. A holder as defined in claim 7, wherein
(a) there are at least two groups of tabs, and the tabs of each group are equispaced radially from said center, and
(b) the tabs of one of said groups are radially spaced from said center a distance greater than the tabs of the other of said groups.

9. A holder for a flower container, comprising
(a) a foldable blank having intermediate its ends a pair of spaced, parallel score lines dividing said blank into a central panel and a pair of spaced side panels, each of which is foldable about one of said score lines to overlie said side panel,
(b) each of said side panels having a straight outer edge, which is remote from and parallel to the score line about which the side panel folds,
(c) each of said side panels having therein a plurality of cuts which extend radially from the midpoint of its outer edge and which divide each side panel into a plurality of generally sector-shaped, flexible tongues, and
(d) each of said side panels having a score line disposed in an arc coaxially about the midpoint of its outer edge and intersecting said radial cuts in the associated side panel, and
(e) means on said central panel for engaging and holding the bottom of a flower container against lateral sliding movement on said central panel.

10. A holder as defined in claim 9, wherein
(a) said means comprises a plurality of tabs pivoted on said central panel and having free ends radially spaced from the center of said central panel, and
(b) at least three of said tabs are equi-spaced radially from said central panel to have the free ends thereof resiliently engageable with the bottom of a flower container at equiangularly spaced points thereabout, when said container is supported on said central panel.

References Cited by the Examiner

UNITED STATES PATENTS

| 1,026,780 | 5/1912 | Asheim | 120—73 |
| 1,990,372 | 2/1935 | Cole | 215—100.5 |
| 2,264,489 | 12/1941 | Tiegler et al. | 248—1 |
| 2,403,746 | 7/1946 | Nutt | 206—79 |

CLAUDE A. LE ROY, *Primary Examiner.*

J. F. FOSS, *Assistant Examiner.*

UNITED STATES PATENT OFFICE
CERTIFICATE OF CORRECTION

Patent No. 3,297,289                 January 10, 1967

Julius La Raus

It is hereby certified that error appears in the above numbered patent requiring correction and that the said Letters Patent should read as corrected below.

Column 4, line 31, for the claim reference numeral "4" read -- 2 --; same column 4, line 39, for the claim reference numeral "5" read -- 3 --.

Signed and sealed this 24th day of October 1967.

(SEAL)
Attest:

Edward M. Fletcher, Jr.                 EDWARD J. BRENNER

Attesting Officer                      Commissioner of Patents